(12) United States Patent
Misra et al.

(10) Patent No.: US 11,213,948 B2
(45) Date of Patent: Jan. 4, 2022

(54) TEMPORAL VARIATION IDENTIFICATION OF REGULATORY COMPLIANCE BASED ROBOTIC AGENT CONTROL

(71) Applicant: ACCENTURE GLOBAL SOLUTIONS LIMITED, Dublin (IE)

(72) Inventors: Janardan Misra, Bangalore (IN); Vikrant Kaulgud, Pune (IN); Divya Rawat, Bangalore (IN); Kapil Singi, Bangalore (IN); Sanjay Podder, Thane (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 453 days.

(21) Appl. No.: 16/186,006

(22) Filed: Nov. 9, 2018

(65) Prior Publication Data
US 2020/0147795 A1 May 14, 2020

(51) Int. Cl.
| | |
|---|---|
| *B25J 9/16* | (2006.01) |
| *G05B 19/41* | (2006.01) |
| *G05B 19/4155* | (2006.01) |
| *G06Q 30/00* | (2012.01) |

(52) U.S. Cl.
CPC .......... *B25J 9/1661* (2013.01); *B25J 9/1653* (2013.01); *G05B 19/4155* (2013.01); *G05B 2219/40392* (2013.01); *G06Q 30/018* (2013.01)

(58) Field of Classification Search
CPC ........ G06Q 30/00; B25J 9/16; G05B 19/4155
See application file for complete search history.

(56) References Cited

U.S. PATENT DOCUMENTS

| | | | | |
|---|---|---|---|---|
| 8,584,247 | B1 * | 11/2013 | Patil ...................... | G06F 21/577 726/25 |
| 2007/0203718 | A1 * | 8/2007 | Merrifield, Jr. .... | G06Q 10/0635 705/317 |
| 2008/0059220 | A1 * | 3/2008 | Roth .................... | G06Q 30/018 705/311 |
| 2015/0348215 | A1 * | 12/2015 | Doll ..................... | G06Q 30/018 705/32 |
| 2016/0203494 | A1 * | 7/2016 | Galligan Davila .. | G06Q 30/018 705/317 |
| 2017/0285628 | A1 * | 10/2017 | Erhart .................. | B25J 13/006 |
| 2018/0140390 | A1 * | 5/2018 | Elsner ................... | A61C 8/006 |
| 2019/0266668 | A1 * | 8/2019 | Vail ...................... | G06Q 30/018 |

FOREIGN PATENT DOCUMENTS

EP    1849069 B1 *  6/2017   ............... G06F 8/71

* cited by examiner

*Primary Examiner* — Kira Nguyen
(74) *Attorney, Agent, or Firm* — Mannava & Kang, P.C.

(57) ABSTRACT

In some examples, temporal variation identification of regulatory compliance based robotic agent control may include ascertaining a temporal sequence of compliance specification text, where the temporal sequence may include time points and versions of the compliance specification text at the time points. For each time point of the temporal sequence of the compliance specification text, a compliance specification graph may be generated. Based on an analysis of each of the generated compliance specification graphs, changes in the temporal sequence of the compliance specification text may be determined. Further, an operation associated with a robotic agent may be controlled by the robotic agent and based on the determined changes in the temporal sequence of the compliance specification text.

20 Claims, 8 Drawing Sheets

ASCERTAIN, BY AT LEAST ONE HARDWARE PROCESSOR, A TEMPORAL SEQUENCE OF COMPLIANCE SPECIFICATION TEXT
702

GENERATE, BY THE AT LEAST ONE HARDWARE PROCESSOR AND FOR EACH TIME POINT OF THE TEMPORAL SEQUENCE OF THE COMPLIANCE SPECIFICATION TEXT, A COMPLIANCE SPECIFICATION GRAPH
704

DETERMINE, BY THE AT LEAST ONE HARDWARE PROCESSOR AND BASED ON AN ANALYSIS OF EACH OF THE GENERATED COMPLIANCE SPECIFICATION GRAPHS, CHANGES IN THE TEMPORAL SEQUENCE OF THE COMPLIANCE SPECIFICATION TEXT
706

MODIFY, BASED ON THE DETERMINED CHANGES IN THE TEMPORAL SEQUENCE OF THE COMPLIANCE SPECIFICATION TEXT, ROBOTIC AGENT INSTRUCTIONS ASSOCIATED WITH A ROBOTIC AGENT
708

CONTROL, BY THE AT LEAST ONE HARDWARE PROCESSOR, BY THE ROBOTIC AGENT, AND BASED ON THE DETERMINED CHANGES IN THE TEMPORAL SEQUENCE OF THE COMPLIANCE SPECIFICATION TEXT, AN OPERATION ASSOCIATED WITH THE ROBOTIC AGENT
710

TEMPORAL VARIATION IDENTIFICATION OF REGULATORY COMPLIANCE BASED ROBOTIC AGENT CONTROL

BACKGROUND

A variety of techniques may be used to control a robotic system. For example, the robotic system may be pre-programmed with a set of instructions to perform a specified task, and/or to control a secondary device. The robotic system instructions may be specified so as to comply with a set of regulations.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Temporal variation identification of regulatory compliance based robotic agent control apparatuses, methods for temporal variation identification of regulatory compliance based robotic agent control, and non-transitory computer readable media having stored thereon machine readable instructions to provide temporal variation identification of regulatory compliance based robotic agent control are disclosed herein. The apparatuses, methods, and non-transitory computer readable media disclosed herein provide for temporal variation identification of regulatory compliance based robotic agent control by identifying changes across various versions of complete compliance specifications (e.g., regulations or sets of regulations) spread across multiple time points. The apparatuses, methods, and non-transitory computer readable media disclosed herein provide for presentation of the identified changes over a timeline in a graphical manner, together with summary statistics. Further, the apparatuses, methods, and non-transitory computer readable media disclosed herein provide a robotic agent controller to control, by a robotic agent and based on the identified changes to the compliance specifications, an operation associated with the robotic agent. For example, the operation associated with the robotic agent may include a movement or another mechanical action associated with the robotic agent and/or further control of a secondary device such as a computer, a machine, and generally, any hardware and/or software component. In this regard, the operation associated with the robotic agent, and/or the hardware and/or software component may be controlled by the robotic agent that utilizes a set of robotic agent instructions that may be specified so as to comply with the compliance specifications. For example, the compliance specifications may specify a time, a location, a speed, and/or other such factors that may govern the control of the operation associated with the robotic agent and/or the secondary device.

With respect to control of a robotic agent, as disclosed herein, a robotic agent may be pre-programmed with a set of instructions to perform a specified task, and/or to control a secondary device. The robotic agent instructions may be specified so as to comply with compliance specifications, such as regulations. In this regard, the pre-programmed instructions may be modified based on changes to such compliance specifications. For example, regulatory compliance may represent a legal requirement to carry out an organization's operations. The regulatory compliance may be operationalized by a set of processes and procedures, which ensure that the organization's operations are in agreement with the rules, regulations, or laws as documented in the regulatory texts. In order to achieve expected regulatory compliance, a precise and comprehensive understanding of the changes which may take place from time-to-time may be needed so that corresponding changes may be applied to operations as well as compliance processes. In this regard, it is technically challenging to determine if changes have occurred in the compliance the specifications, such as regulations, and thereafter to determine an exact nature of the changes.

In order to address at least the aforementioned technical challenges, the apparatuses, methods, and non-transitory computer readable media disclosed herein may identify changes (e.g., of type, structural, as well as semantic) in text of the compliance specifications, such as regulatory text of regulations. Further, the apparatuses, methods, and non-transitory computer readable media disclosed herein may generate a visualization of these changes at various levels of structural hierarchy. Yet further, the apparatuses, methods, and non-transitory computer readable media disclosed herein may generate derivations of temporal summaries for the text of the compliance specifications, such as regulatory text of regulations. Based on the identified changes to the text of the compliance specifications, the apparatuses, methods, and non-transitory computer readable media disclosed herein may provide for control, by a robotic agent and based on the identified changes to the text of the compliance specifications, of an operation associated with the robotic agent.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

Figure 1:
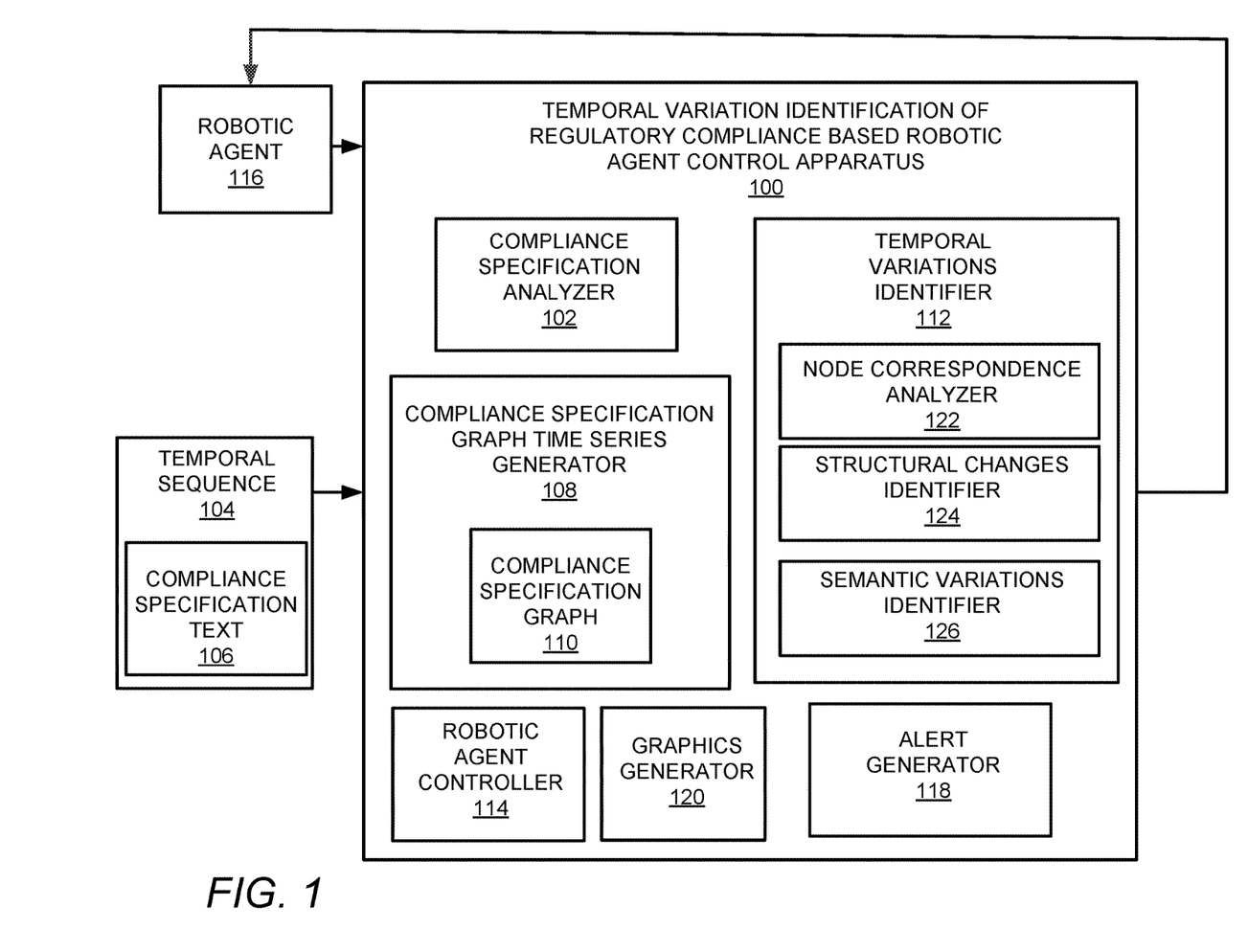
FIG. 1 illustrates a layout of a temporal variation identification of regulatory compliance based robotic agent control apparatus in accordance with an example of the present disclosure.

FIG. 1 illustrates a layout of an example temporal variation identification of regulatory compliance based robotic agent control apparatus (hereinafter also referred to as "apparatus 100").

Referring to FIG. 1, the apparatus 100 may include a compliance specification analyzer 102 that is executed by at least one hardware processor (e.g., the hardware processor 602 of FIG. 6, and/or the hardware processor 804 of FIG. 8) to ascertain a temporal sequence 104 of compliance specification text 106. The temporal sequence 104 may include time points and versions of the compliance specification text 106 at the time points.

A compliance specification graph time series generator 108 that is executed by at least one hardware processor (e.g., the hardware processor 602 of FIG. 6, and/or the hardware processor 804 of FIG. 8) may generate, for each time point of the temporal sequence 104 of the compliance specification text 106, a compliance specification graph 110.

According to examples disclosed herein, the compliance specification graph time series generator 108 may generate, for each time point of the temporal sequence 104 of the compliance specification text 106, the compliance specification graph 110 by generating, for each time point of the temporal sequence 104 of the compliance specification text 106, nodes that correspond to uniquely identified elements in the compliance specification text 106, and generating, for each time point of the temporal sequence 104 of the compliance specification text 106, edges that represent structural and/or semantic relations between the nodes.

According to examples disclosed herein, for the semantic relations between the nodes, the compliance specification graph time series generator 108 may generate, for each time point of the temporal sequence 104 of the compliance specification text 106, the compliance specification graph 110 by generating, for each time point of the temporal sequence 104 of the compliance specification text 106, a directed edge from a first node to a second node if there exists an explicit reference for the second node in text of the first node.

According to examples disclosed herein, for the structural relations between the nodes, the compliance specification graph time series generator 108 may generate, for each time point of the temporal sequence 104 of the compliance specification text 106, the compliance specification graph 110 by connecting, for each time point of the temporal sequence 104 of the compliance specification text 106, sections under a same chapter by neighborhood edges, and connecting, for each time point of the temporal sequence 104 of the compliance specification text 106, section level nodes to chapter level nodes using part-of edges.

A temporal variations identifier 112 that is executed by at least one hardware processor (e.g., the hardware processor 602 of FIG. 6, and/or the hardware processor 804 of FIG. 8) may determine, based on an analysis of each of the generated compliance specification graphs, changes in the temporal sequence 104 of the compliance specification text 106.

According to examples disclosed herein, the temporal variations identifier 112 may determine, based on the analysis of each of the generated compliance specification graphs, changes in the temporal sequence 104 of the compliance specification text 106 by determining a structural variation to determine a difference in compliance specification graph structures for the same compliance specification text at two different time points.

According to examples disclosed herein, the two different time points may include successive time points.

According to examples disclosed herein, the temporal variations identifier 112 may determine the structural variation to determine the difference in compliance specification graph structures for the same compliance specification text at two different time points by determining node correspondence by identifying a first node from a compliance specification graph at a first time point that includes a same intention as a second node from a compliance specification graph at a second time point that is later than the first time point.

According to examples disclosed herein, the temporal variations identifier 112 may determine the structural variation to determine the difference in compliance specification graph structures for the same compliance specification text at two different time points by determining a structural change in the compliance specification graph structures for the same compliance specification text at two different time points as a deletion, an absorption, an addition, and/or an alteration to nodes corresponding to the two different time points.

According to examples disclosed herein, the temporal variations identifier 112 may determine, based on the analysis of each of the generated compliance specification graphs, changes in the temporal sequence of the compliance specification text by determining a semantic variation based on a change to contents of nodes of two of the generated compliance specification graphs.

According to examples disclosed herein, the temporal variations identifier 112 may determine the semantic variation based on the change to contents of nodes of two of the generated compliance specification graphs by determining whether details of a node of corresponding nodes of the two of the generated compliance specification graphs have changed so that an object in a domain of influence has an effect that is opposite to previously implied details of the node. Further, based on a determination that details of the node of the corresponding nodes of the two of the generated compliance specification graphs have changed so that the object in the domain of influence has the effect that is opposite to previously implied details of the node, the temporal variations identifier 112 may determine a compliance specification negation with respect to the corresponding nodes of the two of the generated compliance specification graphs.

According to examples disclosed herein, the temporal variations identifier 112 may determine the semantic variation based on the change to contents of nodes of two of the generated compliance specification graphs by determining whether details of a node of corresponding nodes of the two of the generated compliance specification graphs have changed so that a scope of a domain of influence has an increased effect compared to previously implied details of the node. Further, based on a determination that details of the node of the corresponding nodes of the two of the generated compliance specification graphs have changed so that the scope of the domain of influence has the increased effect compared to previously implied details of the node, the temporal variations identifier 112 may determine a compliance specification expansion with respect to the corresponding nodes of the two of the generated compliance specification graphs.

According to examples disclosed herein, the temporal variations identifier 112 may determine the semantic variation based on the change to contents of nodes of two of the generated compliance specification graphs by determining whether details of a node of corresponding nodes of the two of the generated compliance specification graphs have changed so that a scope of a domain of influence has an effect that is different compared to previously implied details of the node. Further, based on a determination that details of the node of the corresponding nodes of the two of the generated compliance specification graphs have changed so that the scope of the domain of influence has the effect that is different compared to previously implied details of the node, the temporal variations identifier 112 may determine a compliance specification modification with respect to the corresponding nodes of the two of the generated compliance specification graphs.

A robotic agent controller 114 that is executed by at least one hardware processor (e.g., the hardware processor 602 of FIG. 6, and/or the hardware processor 804 of FIG. 8) may control, by a robotic agent 116 and based on the determined changes in the temporal sequence 104 of the compliance specification text 106, an operation associated with the robotic agent 116.

According to examples disclosed herein, the robotic agent controller 114 may control, by the robotic agent 116 and based on the determined changes in the temporal sequence 104 of the compliance specification text 106, the operation associated with the robotic agent 116 by modifying, based on the determined changes in the temporal sequence 104 of the compliance specification text 106, robotic agent instructions associated with the robotic agent 116, and controlling, by the robotic agent 116 and based on the modified robotic agent instructions, the operation associated with the robotic agent 116.

An alert generator 118 that is executed by at least one hardware processor (e.g., the hardware processor 602 of FIG. 6, and/or the hardware processor 804 of FIG. 8) may send alerts to users, and/or the robotic agent 116 via the robotic agent controller 114 as per the configured focus area as disclosed herein. For example, the alerts may include an indication of the changes in the temporal sequence 104 of the compliance specification text 106.

A graphics generator 120 that is executed by at least one hardware processor (e.g., the hardware processor 602 of FIG. 6, and/or the hardware processor 804 of FIG. 8) may generate graphics related to the aforementioned structural and semantic relations between the nodes at the lowest level in the hierarchy, and aggregation may take place on an on-demand basis.

Figure 2:
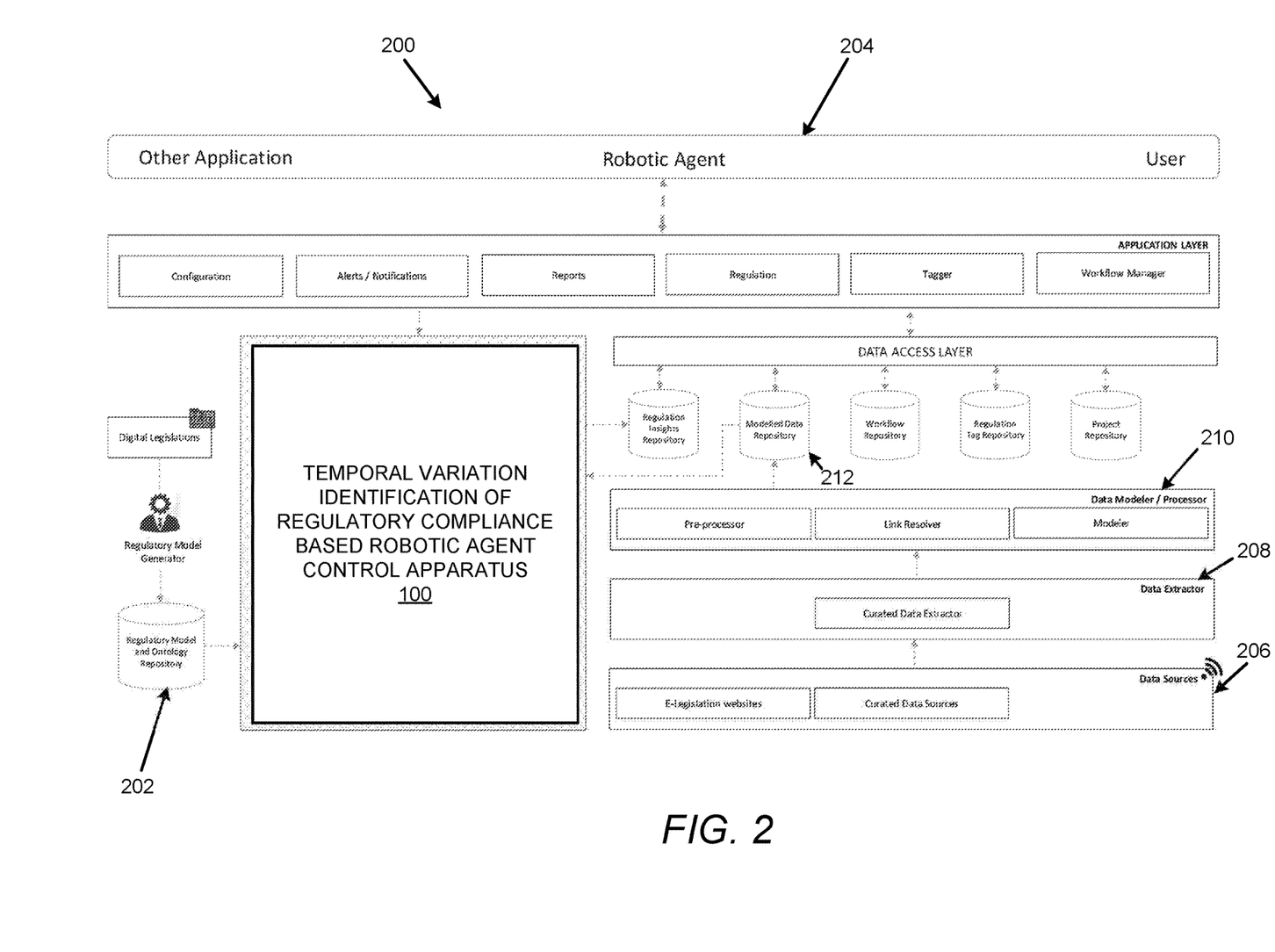
FIG. 2 illustrates an application that may be implemented using components of the regulatory compliance based robotic agent control apparatus of FIG. 1 in accordance with an example of the present disclosure.

FIG. 2 illustrates an application that may be implemented using components of apparatus 100 in accordance with an example of the present disclosure.

Referring to FIG. 2, according to examples disclosed herein, components of the apparatus 100 may be utilized to design an application as shown at 200. For example, the application at 200 may take as input, at 202, a knowledge model, such as a regulation knowledge model, using a repository, such as a regulation repository including an ontology of terms, such as regulatory terms, and details about the structure of associated information, such as regulations, in a hierarchical format. The regulation knowledge model may include information associated with a set of regulations that are analyzed by the apparatus 100 to identify changes in the regulations.

At 204, outputs of the application at 200 may be received either by an end user (e.g., regulatory officer, compliance manager, etc.), another application, or by the robotic agent 116 (controlled by the robotic agent controller 114) capable of processing natural language text and graphs, and capable of interacting with other systems (e.g., a secondary device). The end user, the other application, or the robotic agent may be collectively referred to as 'receiving agents'. These receiving agents may take further actions based upon the changes identified in the regulations of interest as reported by the application at 200 (as well as by the apparatus 100). These receiving agents may access the application at 200 using a suitable interface and may configure focus areas so that application at 200 presents notification only about these regulations whenever they undergo changes.

The input data sources at 206 for the compliance specifications may need to be configured in the application at 200 (e.g., by providing their addresses). Examples of input data sources for the compliance specifications may include legislation websites, curated data sources, news and blog feeds, and other such sources.

Various data extractor services at 208 may receive the compliance specifications, and process the compliance specifications to extract the relevant content for analysis. This content may then be pushed into a data modeler at 210, and thereafter to a modeled data repository at 212 for analysis by the apparatus 100. For example, the data modeler at 210 may include a pre-processor, a link resolver, and a modeler. The pre-processor may process the contents to extract relevant information including headings, embedded links, and other contents from the compliance specifications. The link resolver may process the embedded links, and invoke appropriate communication protocols to access contents of the sources addressed by the links. The modeler may represent extracted contents into a format which can be used for further comparative analysis.

The modeled data repository at 212 may be accessed by a data access layer, which may also access a regulation insights repository, a workflow repository, a regulation tag repository, and a project repository. The regulation insights repository may contain the details of the temporal variations identified by the apparatus 100 to be finally presented to the robotic agent and other entities 204. The workflow repository may contain details on how overall an application should execute once the regulation insights repository is populated with the results by the apparatus 100. Actual execution of a system may be further guided by the regulation tag repository which contains a set of tags (words/phrases) which are matched with the robotic control related details or user interests. Further, the project repository may contain details about which projects are associated with the system where these outputs will be applied. The alert generator 118 may further send alerts to users, and/or the robotic agent 116 via the robotic agent controller 114 as per the configured focus area. A focus area may represent a list of text elements which are selected from the compliance knowledge base.

Referring again to FIG. 1, an input to the compliance specification analyzer 102 may include a temporal sequence of the compliance specification text 106, such as regulatory text: $\{(R_0, t_0), (R_1, t_1), \ldots, (R_n, t_n)\}$, where $t_0 < t_1 < t_2 < \ldots < t_n$ may represent time points in the sequence, and $R_0, R_1, R_2, \ldots, R_n$ may represent versions of the texts at these time points.

The compliance specification graph time series generator 108 may represent a temporal sequence of a compliance specification text as a compliance specification graph 110. Thus, each compliance specification graph 110 may represent a labeled directed graph that represents the compliance specification text 106 for each time point of the temporal sequence.

Figure 3:
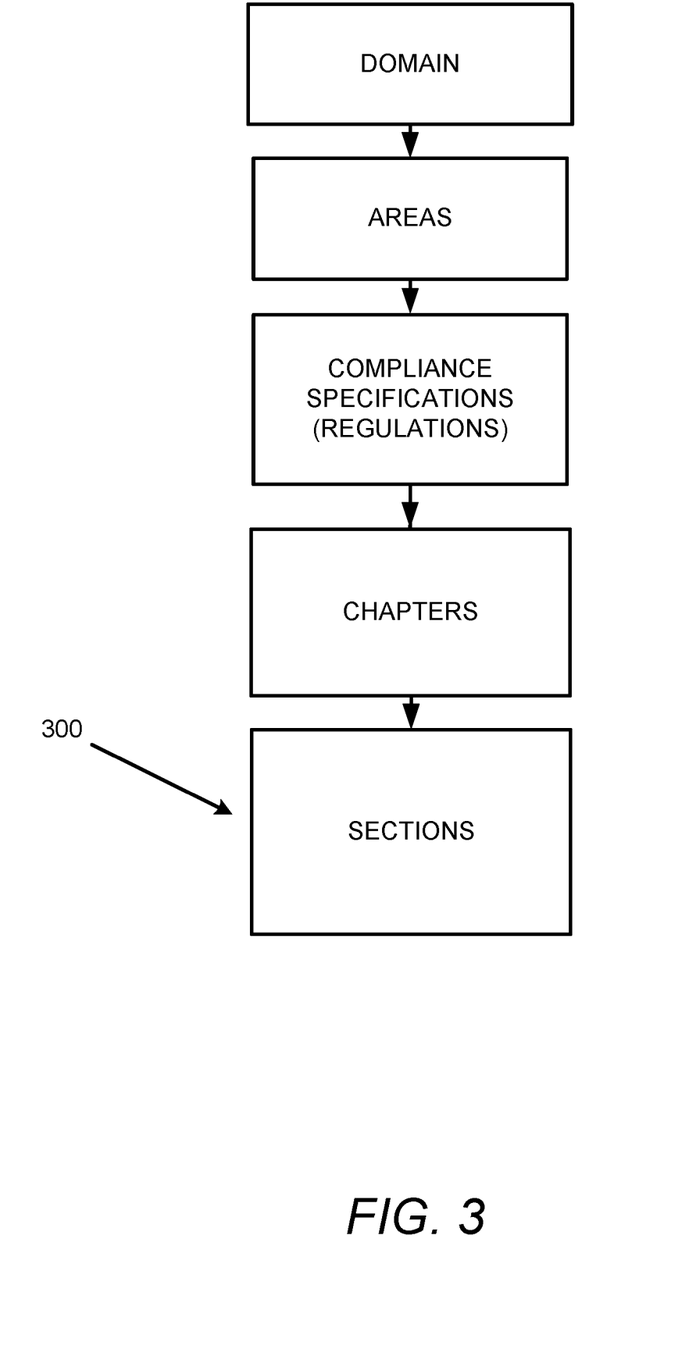
FIG. 3 illustrates a high-level process flow with respect to the temporal variation identification of regulatory compliance based robotic agent control apparatus of FIG. 1 in accordance with an example of the present disclosure.

With respect to the compliance specification graph 110, nodes may represent each uniquely identifiable element of the compliance specification text 106. For example, in FIG. 5, nodes may include {1. Finance, 1.1 Banking, 1.2 Insurance, 1.1.1 Loans, 1.1.2 Savings, 1.2.1 Motor, 1.2.1.a Theft, 1.2.1.b Accident, Section 1.2.1.b.i}. Alternatively, if the compliance specification text 106 is flat (e.g., when the compliance specification text is present only as a linear sequence of paragraphs), then each node may correspond to a paragraph, and may be assigned a paragraph number starting from the beginning. For example, FIG. 3 illustrates a high-level process flow with respect to the apparatus 100 in accordance with an example of the present disclosure. Referring to FIG. 3, for the example of compliance specifications that include regulations, regulations may be organized as Domain→Areas→Regulations→Chapters→Sections. In this case, a lowest level for which there exists a unique identification may include the numbered sections at 300. Thus, nodes may be utilized for each of these numbered elements in the organized hierarchy starting from the sections at 300.

Figure 4:
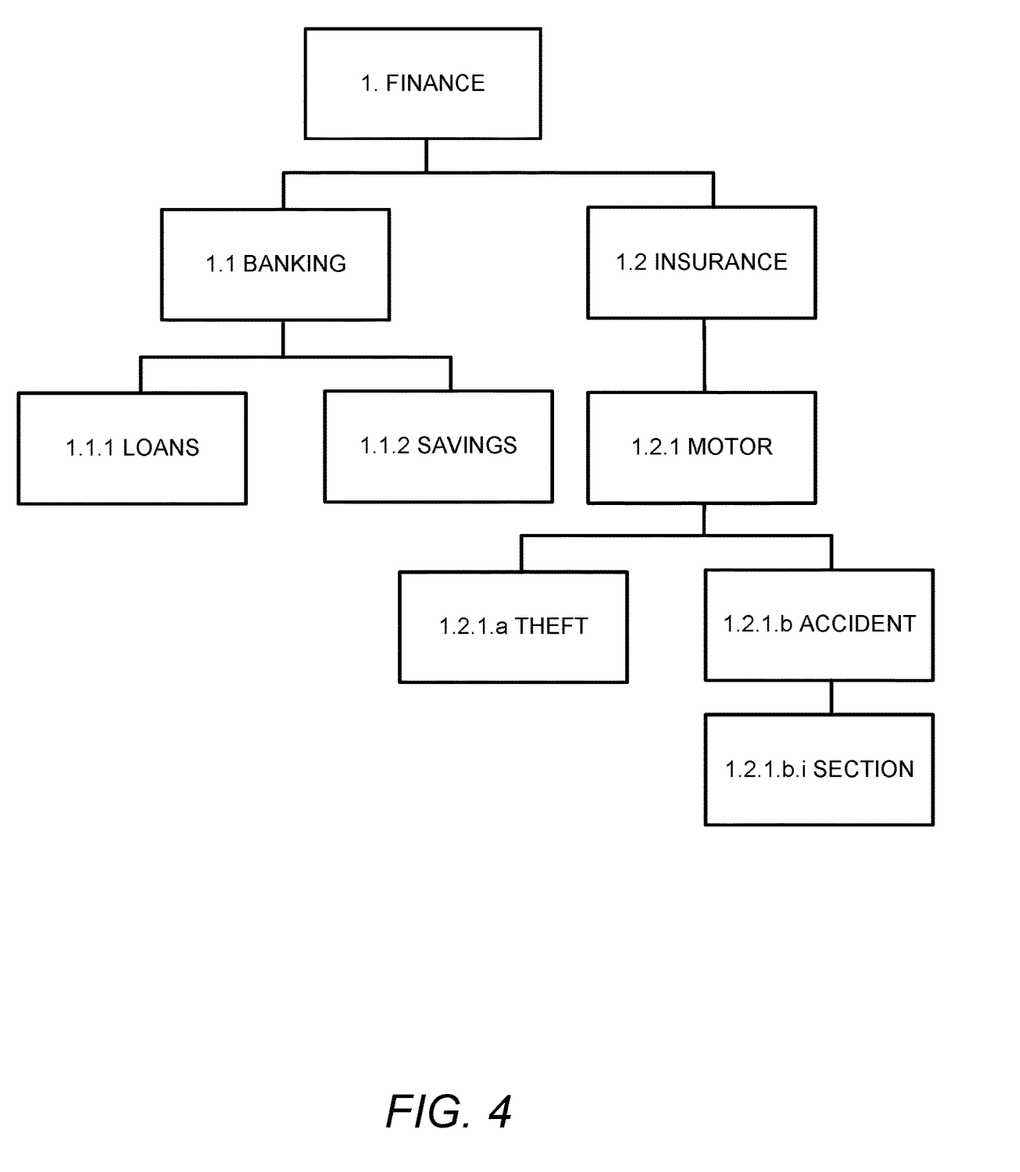
FIG. 4 illustrates a compliance specification to illustrate operation of the temporal variation identification of regulatory compliance based robotic agent control apparatus of FIG. 1 in accordance with an example of the present disclosure.

FIG. 4 illustrates a compliance specification (which is illustrated in the format of a compliance specification graph, but may include other types of formats that link the various components thereof) to illustrate operation of the apparatus 100 in accordance with an example of the present disclosure.

Referring to FIG. 4, the compliance specification may include domain as "finance", areas as "banking" and "insurance", regulations as "loans", "savings", and "motor", chapters as "theft" and "accident", and sections as "section 1.2.1.b.i".

Figure 5:
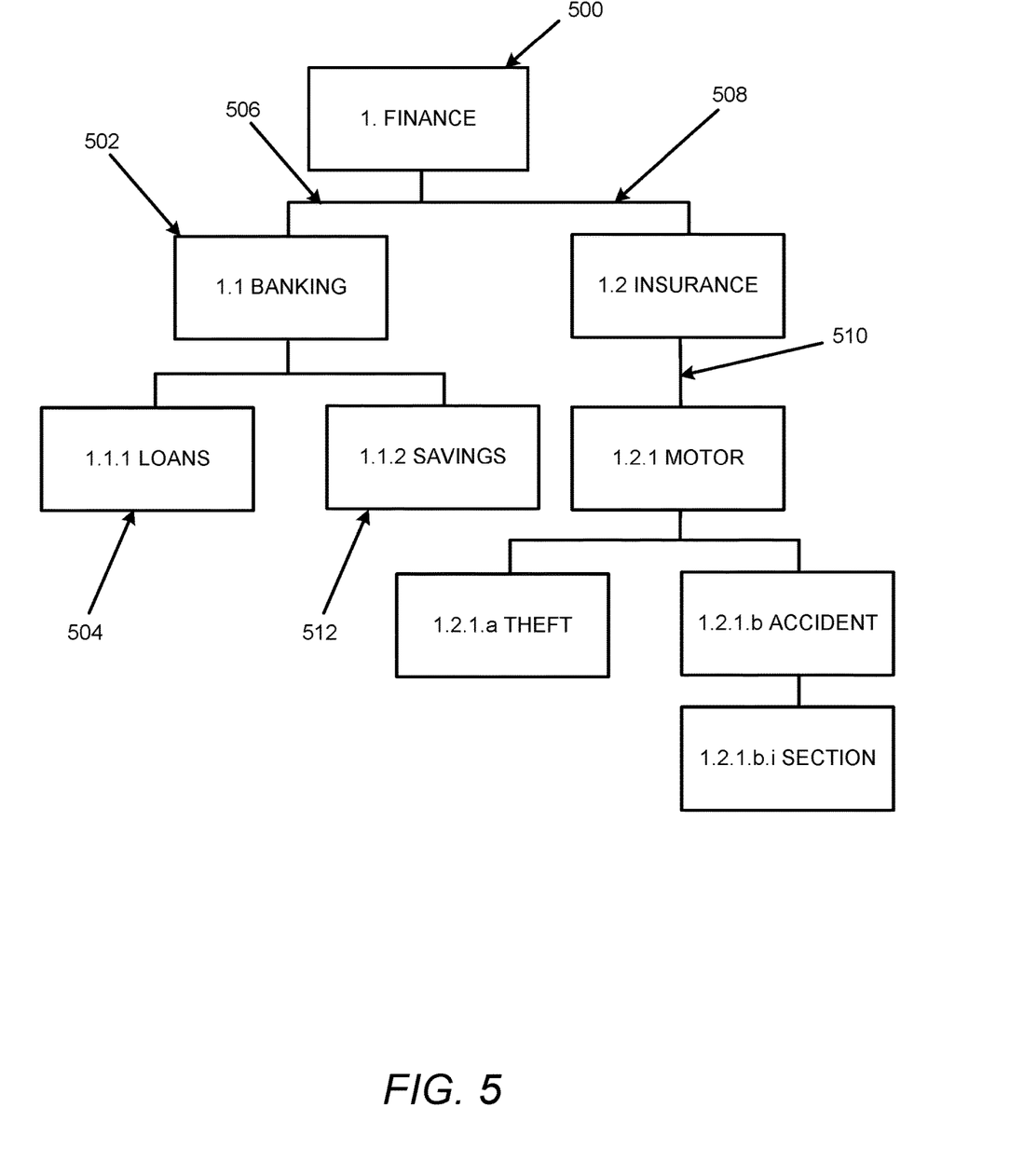
FIG. 5 illustrates a compliance specification graph to illustrate operation of the temporal variation identification of regulatory compliance based robotic agent control apparatus of FIG. 1 in accordance with an example of the present disclosure.

FIG. 5 illustrates a compliance specification graph 110 to illustrate operation of the apparatus 100 in accordance with an example of the present disclosure.

Referring to FIG. 5, each node may be annotated using values of identifier (ID), content, time stamp, and type. The ID may represent a predefined unique identifier given to the text corresponding to the node. For example, as shown in FIG. 5, the node at 500 may include an ID of 1, the node at 502 may include an ID of 1.1, etc. The content may represent the text, for example, of the compliance specification organized under that node. In a structural hierarchy of nodes, contents of the nodes at the higher levels of organization (i.e., at non-leaf level) may be aggregate of the contents of the nodes at lower levels as well as some text that may be part of the node itself (e.g., introductory text of a chapter). With respect to the time stamp, for a leaf node such as node 504 of FIG. 5, the time stamp may represent the time when its contents were modified (or the node changed its structural relationship) the last time. For non-leaf nodes such as node 502 of FIG. 5, the time stamp may either record the latest time point when its own contents were modified or when it changed its structural relationships, or the most recent of the time stamps for all its child nodes. With respect to depths, the node at the highest level in the structural hierarchy (e.g., compliance specification domain) may be assigned depth=1. Further, nodes at the lower levels in the structural hierarchy may be assigned depth as one more than their parent nodes. Types of nodes may include primitive nodes that include the ID, text, time stamp, and depth, and compound nodes that may include the ID, text, time stamp, depth, and set of child nodes of either type.

Edges, such as edge 506 in FIG. 5, may represent structural or semantic type of relations among nodes. With respect to structural relations, a first type of a structural relationship may include a "neighborhood" where all nodes with the same structural unit may be connected by neighborhood type edges, such as edges 506 and 508. For example, all sections under the same chapter may be connected by neighborhood edges. With respect to structural relations, a second type of structural relationship may include nodes that are connected to their next level nodes in the structural hierarchy by "part-of" relations. For example, all the section level nodes may be joined to the chapter level nodes using 'part-of' edges, such as edge 510 of FIG. 5.

With respect to semantic relationships, a first type of semantic relationship may be referred to as a referential relationship where a directed edge may exist from node A to node B if there exists an explicit reference for node B in the text of node A. For example, in "Chapter A, " . . . Apart from the listed objects herein, this condition also applies to all those mentioned in Chapter B.""

With respect to semantic relationships, a second type of semantic relationship may be referred to as an inferential relationship that is determined by inferring semantic relatedness and measuring the strength of the relationship of the nodes at the same level. The strength of the relationship may be measured by a text similarity technique.

Relationships between primitive nodes (e.g., at the same depth) may need to be determined by semantic analysis of the contents of the nodes. However, for the compound nodes at the higher levels of the structural hierarchy, semantic relatedness may be estimated by devising techniques of aggregation of the semantic relatedness scores at the lower level (e.g., using nodes, which are connected to them using 'part-of' edges) as well as semantic relatedness of the contents belonging only to the nodes (without belonging to nodes at lower levels). For example, in order to estimate semantic relatedness between two chapter level nodes, an average of the pair wise semantic relatedness scores of the sections under these chapters may be determined, which can be added with the semantic relatedness between contents of the chapters, which lie outside of their sections.

The graphics generator 120 may generate the aforementioned structural and semantic relations between the nodes at the lowest level in the hierarchy, and aggregation may take place on an on-demand basis. For example, "Chapter A " . . . All commercial vehicles must be insured annually . . ." is semantically related to Chapter B: " . . . Road tax must be paid every seven years for all private commercial vehicles . . . .""

The temporal variations identifier 112 may identify temporal variations, for example, by identifying structural variations, and identifying semantic variations. With respect to structural variations, structural variations may be used to identify differences in the graph structures for the same compliance specification text 106 (e.g., regulatory text) at two different time points (e.g., where a default may be specified as successive time-points).

Based on the identified structural and semantic variations, the node correspondence analyzer 122 may determine correspondence between nodes in both the compliance specification graphs (e.g., regulation graphs), for example by using headlines or contents. The node correspondence analyzer 122 may detect such changes by identifying nodes (e.g., one from the compliance specification graph 110, such as the regulatory graph, at earlier time point and another from the compliance specification graph 110 at the later time point) that correspond to the same underlying intention. For example, according to a first case that represents correspondence at a leaf level, two nodes at the lowest level of the hierarchy may be considered the same if they have the same content (even though they may have different IDs). For example, for two sections including Sec1.1.1 and Sec1.3.1 having same contents, the nodes corresponding to these sections may be considered same even though they have different IDs. According to a second case that represents correspondence at the non-leaf level, to nodes at higher levels of the hierarchy may be considered the same only if they have the same content headings as well as identical descendants (e.g., subtree equivalence), even though they may have different IDs. For example, for two chapters including Chapter 5 and Chapter 11 having the same contents and similar sections under them, the nodes corresponding to these chapters may be considered the same even though they have different IDs.

The structural changes identifier 124 may identify structural variations that may occur, for example, as deletions, absorptions, additions, and alterations. For example, the structural changes identifier 124 may identify nodes in the compliance specification graph 110 at an earlier time point, which have been deleted, structurally shifted, or absorbed. With respect to nodes that have been absorbed, for changes to a chapter, at timepoint 1: Chap 5 Accidents <XXX> Sec 5.1 <YYY> Sec 5.2 <ZZZ>→At timepoint 2: Chap 5 Accidents <XXX YYY> Sec 5.2 <ZZZ>, in this case, contents of Section 5.1 (represented by <YYY>) were absorbed within the contents of the Chap 5 Accidents. Further, the structural changes identifier 124 may identify nodes in the compliance specification graph 110 at a later time point, which have been absent in the graph at the earlier time point.

With respect to deletions, the structural changes identifier 124 may identify all of the nodes that were present in the compliance specification graph 110, such as a RegText graph, at an earlier, but are absent in the compliance specification graph 110 at the later time point. For example, "A section in a chapter is removed."

With respect to absorptions, content of a leaf level node may be merged with another note. These changes may have an impact of change of the scope of the conditions and/or details specified in the original note. Absorptions may occur only for nodes at the lowest levels in the structural hierarchy (e.g., nodes 504 and 512 of FIG. 5). At other levels, these aspects may be classified as alterations. For example, "A section specifying a condition which was limited in its scope to current chapter, is moved to the regulation level, where it becomes applicable to all the chapters under that regulation."

Additions may identify all nodes which are present in the compliance specification graph 110 (e.g., the RegText graph) at a later point, but are absent in the graph at the earlier time point. For example, "Addition of a new chapter under a regulation will have corresponding effect of addition of a new node under the chapter node".

Alterations may identify nodes that may have been shifted from one location to another location (e.g., a node that has changed its neighborhood and/or part-of relations). For example, "A section specifying a condition which was limited in its scope to current chapter, is moved to the regulation level, where it becomes applicable to all the chapters under the regulation."

The semantic variations identifier 126 may identify compliance specification negations, such as regulatory negations, compliance specification expansions, such as regulatory expansions, and compliance specification modifications, such as regulatory modifications. In this regard, the semantic variations identifier 126 may identify compliance specification variations resulting from changes in contents of the nodes. With respect to compliance specification negations, such as regulatory negations, details of a node may be changed so that at least one object in its domain of influence has an effect opposite of what details of the earlier node implied. For example, a first cause may include effect list shrinkage that may occur when there exists a list of objects mentioned at the earlier time point, but one or more of the objects from that list are removed from the list at a later time point. This may have an effect that some condition that was applicable to the removed objects earlier is no longer applicable. For example, "Chap A[time: 2010]: "Mandatory approvals are required before commencing any profit based business operation with any legal entity associated with countries X, Y, W, and Z" is negated with respect to W in the following update "Chap A[time: 2013] "Mandatory approvals are required before commencing any profit based business operation with any legal entity associated with countries X, Y, and Z.""

A second cause may include conditional negation where change of the conditionals in a clause, that is, condition implying terms may be modified such that the effect of the new conditions are opposite on at least one of the objects of their influence. For example, "Chap A[time: 2010]: "all citizens with annual income of USD one million or more must make their submissions electronically," and Chap A[time: 2013] "all citizens with annual income of USD five million or more must make their submissions electronically."" In this example, the condition of mandatory electronic submission may be changed such that it no longer applies to those with an income more than USD one million and less than USD five million.

A third cause may include class-type negation, where a class type of objects may be changed such that a new class contains less objects than before. For example, "Chap A[time: 2010]: "all passenger cars are required to submit emission test certificates annually," and "Chap A[time: 2013] "all fuel based passenger cars are required to submit emission test certificates annually."" In this example, the condition of mandatory submission of mandatory emission test certificate is modified to exclude non-fuel based passenger cars (e.g., electric cars).

With respect to compliance specification expansion, such as regulatory expansion, the semantic variations identifier 126 may determine whether details of a node are changed so that scope of its domain of influence has an increased effect as compared to what details of the node at an earlier time point implied. In this regard, the semantic variations identifier 126 may determine expansion caused by effect list increment, negations caused by conditional expansion, and negations caused by class type expansion.

With respect to effect list increment, a first cause may include an effect list expansion where there exists a list of objects mentioned at the earlier time point, and one or more new objects to that list are added at a later time point. This may have an effect that the underlying condition becomes applicable to the newly added objects, thus expanding the semantic scope of the note. For example, ""Chap A[time: 2010]: "Mandatory approvals are required before commencing any profit based business operation with any legal entity associated with countries X, Y, and Z," may be expanded with inclusion of W to "Chap A[time: 2013] "Mandatory approvals are required before commencing any profit based business operation with any legal entity associated with countries X, Y, W, and Z.""

With respect to conditional expansion, conditional expansion may represent a change of the conditionals in a clause, that is, a condition implying that terms are modified such that the effect of new conditions are expanded on at least one of the objects of their influence. For example, ""Chap A[time: 2010]: "all citizens with annual income of USD five million or more must make their submissions electronically," may be expanded to "Chap A[time: 2013] "all citizens with annual income of USD one million or more must make their submissions electronically."" In this example, the condition of mandatory electronic submission may be changed such that it also applies to those with income more than USD one million and less than USD five million as compared to an earlier condition which was applicable only to those with incomes greater than five million.

With respect to class-type expansion, class type reference of objects may be changed such that a new class specifies more of the objects than before. For example, "Chap A[time: 2010]: "all passenger cars are required to submit engine fitness test results annually," may be expanded to Chap A[time: 2013] "all automobiles are required to submit engine fitness test results annually."" In this example, the condition of mandatory submission of the engine fitness test result may be modified to include all other types of vehicles apart from passenger cars (e.g., truck, bus, special vehicles, etc.).

With respect to modifications, such as regulatory modifications, though semantic variations identifier 126 may identify modifications where details of a node may be changed so that a scope of its domain of influence has an effect that is different from what details of the node at an earlier time point implied. This may include the result of an underlying condition getting changed from one type to another. For example, "Chap A[time: 2010]: "subject convicted of the crime may serve imprisonment up to 5 years," may be modified to Chap A[time: 2013] "subject convicted of the crime may pay penalty of 50% of his/her annual income for up to 5 years."" In this example, a condition of spending time in jail may be modified to forfeiting income as penalty.

The temporal variations identifier 112 may generate a summary of temporal variations by measuring temporal stabilities, temporal intensities, and temporally correlated variations, such as temporally correlated compliance specification variations. In this regard, the temporal variations identifier 112 may identify patterns of temporal variations across user selected timescales. In order to identify such patterns, the temporal variations identifier 112 may first identify nodes that persist across all time points on the selected timeline.

With respect to measurement of temporal stabilities, the temporal variations identifier 112 may count a number of variations associated with each node across a timeline. These may either be collective variations of all types (e.g., default choice) or based upon a user choice of specific types of variations. With respect to temporal stabilities, and collective variations of all types and a user choice of specific types of variations, according to examples, for changes to a chapter for a timeline consisting of three timepoints: timepoint t1: Chap 5 Accidents <XXX> Sec 5.1 <YYY> Sec 5.2 <ZZZ>→timepoint t2: Chap 5 Accidents <XXXYYY> Sec 5.2 <ZZZ>→timepoint t3: Chap 5 Accidents <XXXYYY> Sec 5.2 <UUU>, in this case, there is one structural change (type: absorption) and one semantic variation for the contents of Section 5.2 (<ZZZ> changing to <UUU>) of type: modification. As a result, the temporal variations identifier 112 may count collective variations of all types as two, whereas counts for variations of types 'absorption' and 'modification' will be one, and for all other types it will be zero. The temporal variations identifier 112 may rank nodes at the same level based upon the estimated frequency of variations such that nodes with the maximum number of variations are ranked at the top whereas nodes with a least number of variations are ranked at the bottom. For example, for changes to a chapter for a timeline consisting of three timepoints: timepoint t1: Chap 5 Accidents <XXX> Sec 5.1 <YYY> Sec 5.2 <ZZZ>→timepoint t2: Chap 5 Accidents <XXX> Sec 5.1 <YYY> Sec 5.2 <ZZT>→timepoint t3: Chap 5 Accidents <XXX> Sec 5.1 <YYY> Sec 5.2 <ZZTU>, in this case, there are two semantic variations for the Sec 5.2 (<ZZZ> changing to <ZZT> changing to <ZZTU>) of type: modification, whereas Sec 5.1 remains the same throughout. As a result, the temporal variations identifier 112 may rank Sec 5.2 higher compared to Sec 5.1. The temporal variations identifier 112 may select, for example, a bottom five percentile of nodes as relatively most stable at each level. The temporal variations identifier 112 may select, for example, top five percentile of nodes as relatively least stable or most volatile at each level.

With respect to measurement of temporally correlated compliance specification variations, the temporal variations identifier 112 may identify if there are nodes for which changes appear to be co-occurring. In this regard, the temporal variations identifier 112 may consider a time series of changes (e.g., a number of changes) for all the nodes for all time points on the selected timeline and determined Pearson correlation-coefficient between every pair of nodes using these time series. Node-pairs for which Pearson correlation-coefficient are positive and relatively higher are those where temporal variations are co-occurring. For example, for three section level nodes within a chapter, suppose time series of their changes across a timeline of 5 timepoints are as follows: Sec 1: $\{0,0,1,2,0\}$; Sec 2: $\{2,0,0,1,1\}$, and Sec 3: $\{0,0,2,3,1\}$, the Pearson correlation-coefficients for each pair of nodes are Pearson(Sec 1, Sec 2)=$-0.13$, Pearson(Sec 1, Sec 3)=$0.94$, and Pearson(Sec 2, Sec 3)=$-0.18$. Based upon these estimates, the temporal variations identifier 112 may determine that changes in Sec 1 and Sec 3 are co-occurring. The temporal variations identifier 112 may determine (e.g., estimate) correlations among the series on a pairwise manner to generate a covariance matrix. With respect to the covariance matrix, in above example, the covariance matrix may include these pair-wise Pearson correlation coefficients. The temporal variations identifier 112 may select a threshold (e.g., 0.85), and output all of the node pairs including correlations above this threshold as highly correlated. The temporal variations identifier 112 may generate a covariance graph among nodes with a correlation coefficient as the weight of the edges. In this regard, with each edge of the graph, the temporal variations identifier 112 may associate an attribute name weight and assign it a value equal to the correlation coefficient between the nodes. All of the edges having a weight less than the threshold may be removed. With respect to the remaining graph, the temporal variations identifier 112 may apply graph clustering to identify groups of nodes that appear to undergo changes collectively.

The alert generator 118 may then send alerts to the users, and/or the robotic agent controller 114 as per the configured focus area. In this regard, the alert generator may generate a visualization of temporal variations and their summaries. For example, the alert generator may generate a graph to depict the variations over timescales by implementing dynamic graph visualization. With respect to alerts, for those node of the compliance specification for which the robotic agent or user have configured the system to send alters, these details may be combined together to form a summary. These summaries may be communicated to the robotic agent or user.

Figure 6:
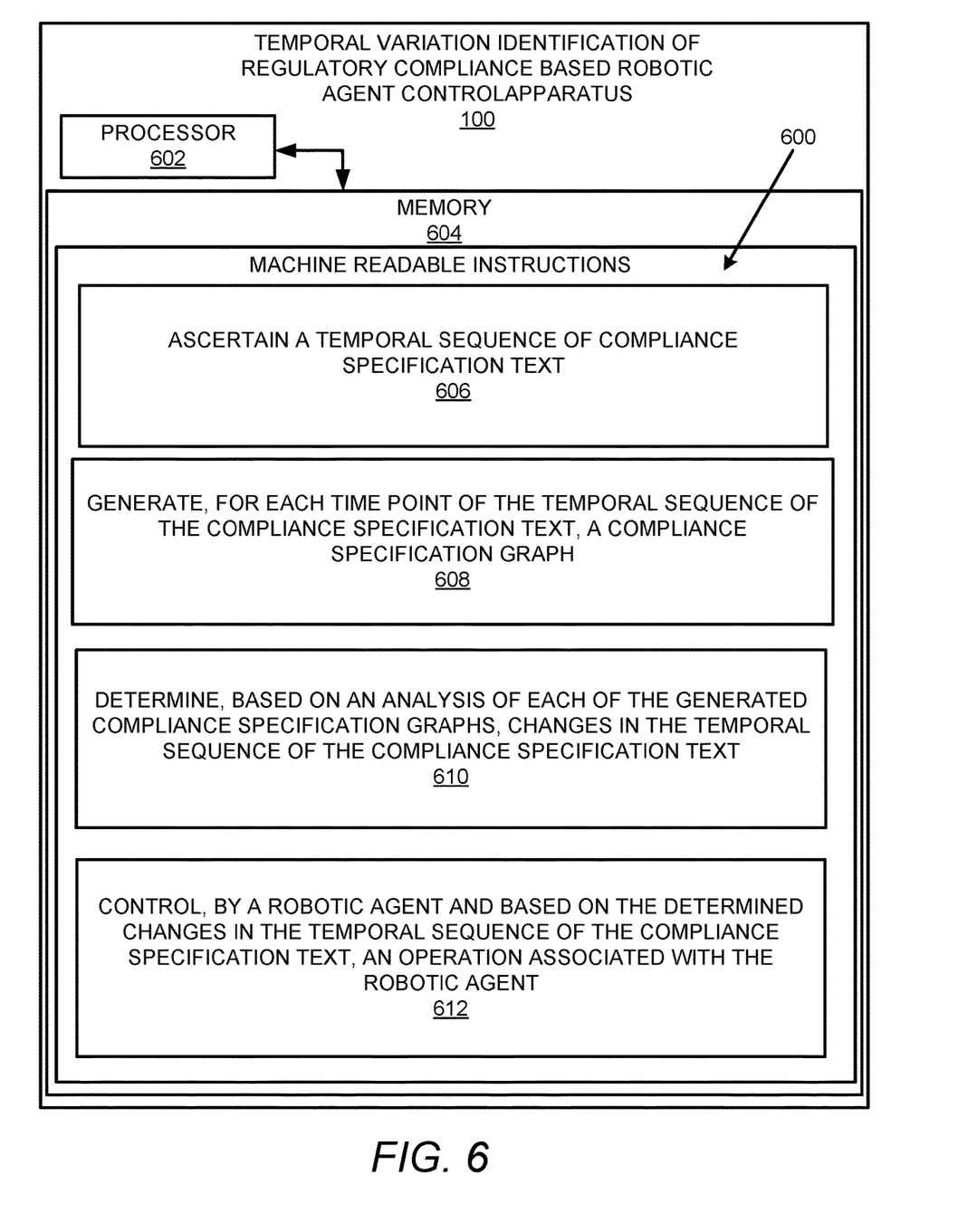
FIG. 6 illustrates an example block diagram for temporal variation identification of regulatory compliance based robotic agent control in accordance with an example of the present disclosure.
Figure 7:
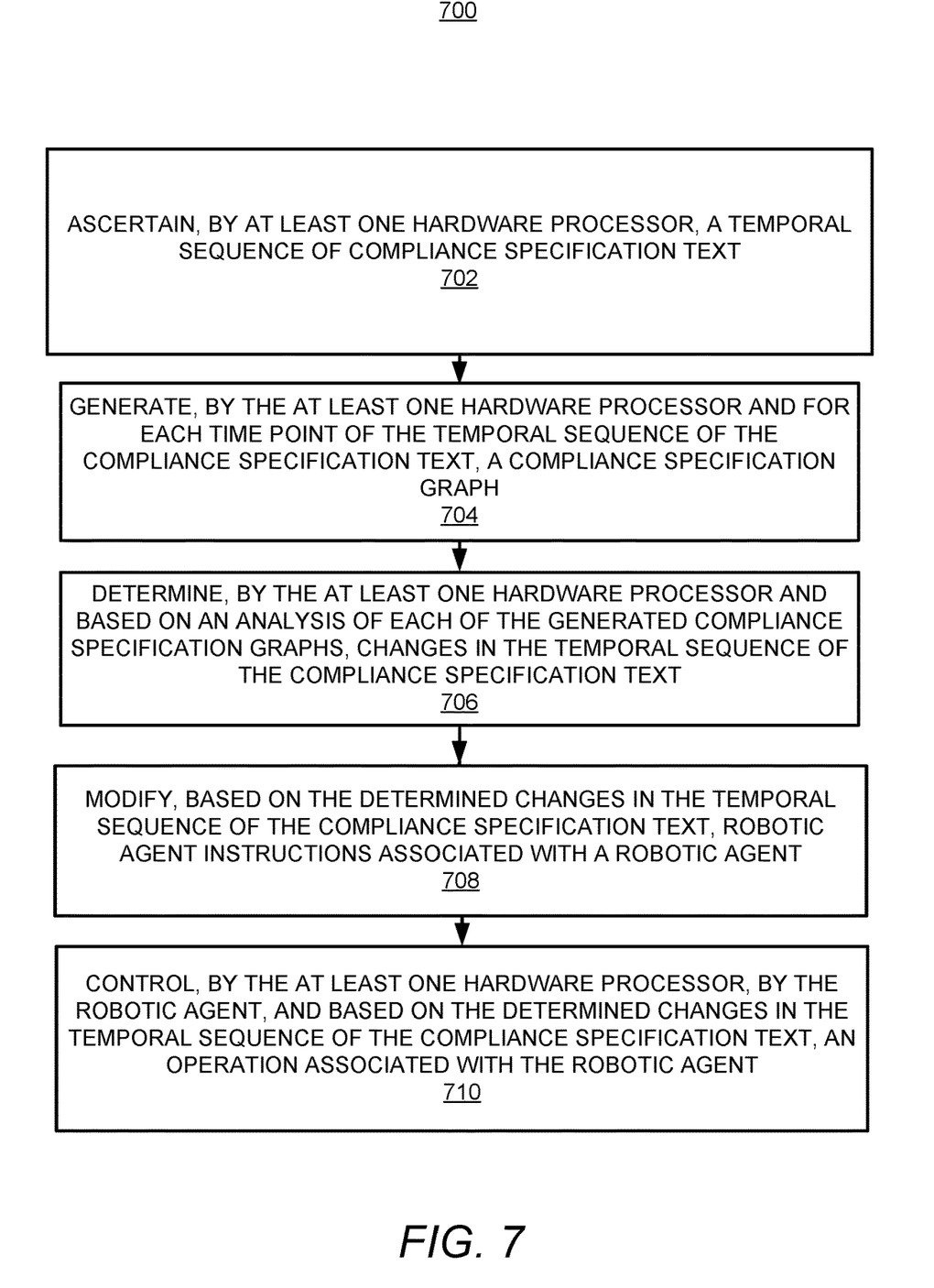
FIG. 7 illustrates a flowchart of an example method for temporal variation identification of regulatory compliance based robotic agent control in accordance with an example of the present disclosure.
Figure 8:
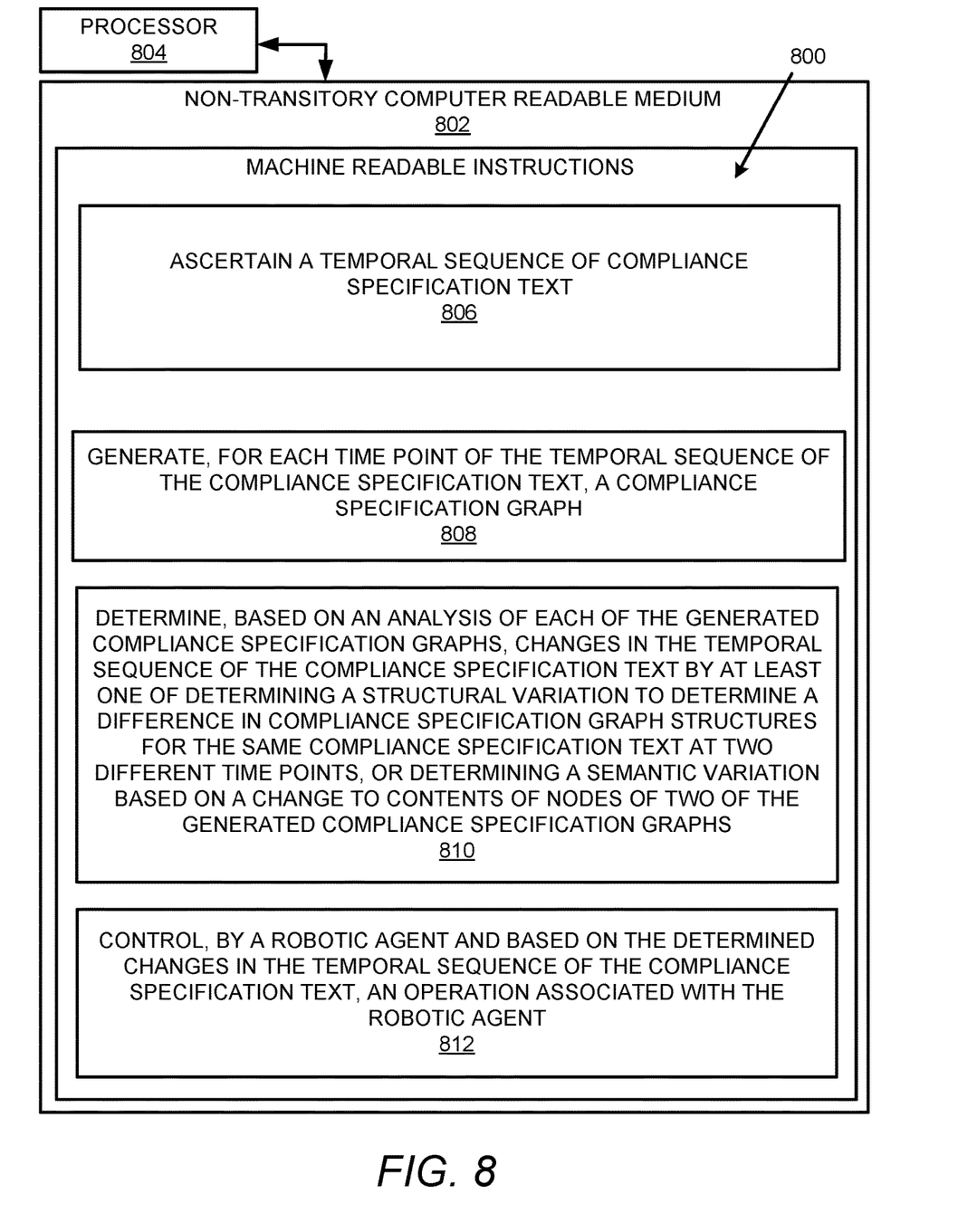
FIG. 8 illustrates a further example block diagram for temporal variation identification of regulatory compliance based robotic agent control in accordance with another example of the present disclosure.

FIGS. 6-8 respectively illustrate an example block diagram 600, a flowchart of an example method 700, and a further example block diagram 800 for temporal variation identification of regulatory compliance based robotic agent control, according to examples. The block diagram 600, the method 700, and the block diagram 800 may be implemented on the apparatus 100 described above with reference to FIG. 1 by way of example and not of limitation. The block diagram 600, the method 700, and the block diagram 800 may be practiced in other apparatus. In addition to showing the block diagram 600, FIG. 6 shows hardware of the apparatus 100 that may execute the instructions of the block diagram 600. The hardware may include a processor 602, and a memory 604 storing machine readable instructions that when executed by the processor cause the processor to perform the instructions of the block diagram 600. The memory 604 may represent a non-transitory computer readable medium. FIG. 7 may represent an example method for temporal variation identification of regulatory compliance based robotic agent control, and the steps of the method. FIG. 8 may represent a non-transitory computer readable medium 802 having stored thereon machine readable instructions to provide temporal variation identification of regulatory compliance based robotic agent control according to an example. The machine readable instructions, when executed, cause a processor 804 to perform the instructions of the block diagram 800 also shown in FIG. 8.

The processor 602 of FIG. 6 and/or the processor 804 of FIG. 8 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 802 of FIG. 8), such as hardware storage devices (e.g., RAM (random access memory), ROM (read only memory), EPROM (erasable, programmable ROM), EEPROM (electrically erasable, programmable ROM), hard drives, and flash memory). The memory 604 may include a RAM, where the machine readable instructions and data for a processor may reside during runtime.

Referring to FIGS. 1-6, and particularly to the block diagram 600 shown in FIG. 6, the memory 604 may include instructions 606 to ascertain a temporal sequence 104 of compliance specification text 106. The temporal sequence 104 may include time points and versions of the compliance specification text 106 at the time points.

The processor 602 may fetch, decode, and execute the instructions 608 to generate, for each time point of the temporal sequence 104 of the compliance specification text 106, a compliance specification graph 110.

The processor 602 may fetch, decode, and execute the instructions 610 to determine, based on an analysis of each of the generated compliance specification graphs, changes in the temporal sequence 104 of the compliance specification text 106.

The processor 602 may fetch, decode, and execute the instructions 612 to control, by a robotic agent 116 and based on the determined changes in the temporal sequence 104 of the compliance specification text 106, an operation associated with the robotic agent 116.

Referring to FIGS. 1-5 and 7, and particularly FIG. 7, for the method 700, at block 702, the method may include ascertaining a temporal sequence 104 of compliance specification text 106. The temporal sequence 104 may include time points and versions of the compliance specification text 106 at the time points.

At block 704, the method may include generating, for each time point of the temporal sequence 104 of the compliance specification text 106, a compliance specification graph 110.

At block 706, the method may include determining, based on an analysis of each of the generated compliance specification graphs, changes in the temporal sequence 104 of the compliance specification text 106.

At block 708, the method may include modifying, based on the determined changes in the temporal sequence 104 of the compliance specification text 106, robotic agent instructions associated with a robotic agent 116.

At block 710, the method may include controlling, by the robotic agent 116 and based on the determined changes in the temporal sequence 104 of the compliance specification text 106, an operation associated with the robotic agent 116.

Referring to FIGS. 1-5 and 8, and particularly FIG. 8, for the block diagram 800, the non-transitory computer readable medium 802 may include instructions 806 to ascertain a temporal sequence 104 of compliance specification text 106. The temporal sequence 104 may include time points and versions of the compliance specification text 106 at the time points.

The processor 804 may fetch, decode, and execute the instructions 808 to generate, for each time point of the temporal sequence 104 of the compliance specification text 106, a compliance specification graph 110.

The processor 804 may fetch, decode, and execute the instructions 810 to determine, based on an analysis of each of the generated compliance specification graphs, changes in the temporal sequence 104 of the compliance specification text 106 by determining a structural variation to determine a difference in compliance specification graph structures for the same compliance specification text at two different time points, and/or determining a semantic variation based on a change to contents of nodes of two of the generated compliance specification graphs.

The processor 804 may fetch, decode, and execute the instructions 812 to control, by a robotic agent 116 and based on the determined changes in the temporal sequence 104 of the compliance specification text 106, an operation associated with the robotic agent 116.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A temporal variation identification of regulatory compliance based robotic agent control apparatus comprising:
a compliance specification analyzer, executed by at least one hardware processor, to
ascertain a temporal sequence of compliance specification text, wherein the temporal sequence includes time points and versions of the compliance specification text at the time points;
a compliance specification graph time series generator, executed by the at least one hardware processor, to
generate, for each time point of the temporal sequence of the compliance specification text, a compliance specification graph by:
generating, for each time point of the temporal sequence of the compliance specification text, nodes that correspond to uniquely identified elements in the compliance specification text; and
generating, for each time point of the temporal sequence of the compliance specification text, edges that represent at least one of structural or semantic relations between the nodes;
a temporal variations identifier, executed by the at least one hardware processor, to
determine, based on an analysis of each of the generated compliance specification graphs, changes in the temporal sequence of the compliance specification text; and
a robotic agent controller, executed by the at least one hardware processor, to
control, by a robotic agent and based on the determined changes in the temporal sequence of the compliance specification text, an operation associated with the robotic agent by:
modifying, based on the determined changes in the temporal sequence of the compliance specification text, robotic agent instructions associated with the robotic agent; and
controlling, by the robotic agent and based on the modified robotic agent instructions, the operation associated with the robotic agent.

2. The apparatus according to claim 1, wherein for the semantic relations between the nodes, the compliance specification graph time series generator is executed by the at least one hardware processor to generate, for each time point of the temporal sequence of the compliance specification text, the compliance specification graph by:
generating, for each time point of the temporal sequence of the compliance specification text, a directed edge from a first node to a second node if there exists an explicit reference for the second node in text of the first node.

3. The apparatus according to claim 1, wherein for the structural relations between the nodes, the compliance specification graph time series generator is executed by the at least one hardware processor to generate, for each time point of the temporal sequence of the compliance specification text, the compliance specification graph by:
connecting, for each time point of the temporal sequence of the compliance specification text, sections under a same chapter by neighborhood edges; and
connecting, for each time point of the temporal sequence of the compliance specification text, section level nodes to chapter level nodes using part-of edges.

4. The apparatus according to claim 1, wherein the temporal variations identifier is executed by the at least one hardware processor to determine, based on the analysis of each of the generated compliance specification graphs, changes in the temporal sequence of the compliance specification text by:
determining a structural variation to determine a difference in compliance specification graph structures for the same compliance specification text at two different time points.

5. The apparatus according to claim 4, wherein the two different time points include successive time points.

6. The apparatus according to claim 4, wherein the temporal variations identifier is executed by the at least one hardware processor to determine the structural variation to determine the difference in compliance specification graph structures for the same compliance specification text at two different time points by:
determining node correspondence by identifying a first node from a compliance specification graph at a first time point that includes a same intention as a second node from a compliance specification graph at a second time point that is later than the first time point.

7. The apparatus according to claim 4, wherein the temporal variations identifier is executed by the at least one hardware processor to determine the structural variation to determine the difference in compliance specification graph structures for the same compliance specification text at two different time points by:
determining a structural change in the compliance specification graph structures for the same compliance specification text at two different time points as at least one of a deletion, an absorption, an addition, or an alteration to nodes corresponding to the two different time points.

8. The apparatus according to claim 1, wherein the temporal variations identifier is executed by the at least one hardware processor to determine, based on the analysis of each of the generated compliance specification graphs, changes in the temporal sequence of the compliance specification text by:
determining a semantic variation based on a change to contents of nodes of two of the generated compliance specification graphs.

9. The apparatus according to claim 8, wherein the temporal variations identifier is executed by the at least one hardware processor to determine the semantic variation based on the change to contents of nodes of two of the generated compliance specification graphs by:
determining whether details of a node of corresponding nodes of the two of the generated compliance specification graphs have changed so that an object in a domain of influence has an effect that is opposite to previously implied details of the node; and
based on a determination that details of the node of the corresponding nodes of the two of the generated compliance specification graphs have changed so that the object in the domain of influence has the effect that is opposite to previously implied details of the node, determining a compliance specification negation with respect to the corresponding nodes of the two of the generated compliance specification graphs.

10. The apparatus according to claim 8, wherein the temporal variations identifier is executed by the at least one hardware processor to determine the semantic variation based on the change to contents of nodes of two of the generated compliance specification graphs by:

determining whether details of a node of corresponding nodes of the two of the generated compliance specification graphs have changed so that a scope of a domain of influence has an increased effect compared to previously implied details of the node; and based on a determination that details of the node of the corresponding nodes of the two of the generated compliance specification graphs have changed so that the scope of the domain of influence has the increased effect compared to previously implied details of the node, determining a compliance specification expansion with respect to the corresponding nodes of the two of the generated compliance specification graphs.

11. The apparatus according to claim 8, wherein the temporal variations identifier is executed by the at least one hardware processor to determine the semantic variation based on the change to contents of nodes of two of the generated compliance specification graphs by:

determining whether details of a node of corresponding nodes of the two of the generated compliance specification graphs have changed so that a scope of a domain of influence has an effect that is different compared to previously implied details of the node; and based on a determination that details of the node of the corresponding nodes of the two of the generated compliance specification graphs have changed so that the scope of the domain of influence has the effect that is different compared to previously implied details of the node, determining a compliance specification modification with respect to the corresponding nodes of the two of the generated compliance specification graphs.

12. A method for temporal variation identification of regulatory compliance based robotic agent control, the method comprising:

ascertaining, by at least one hardware processor, a temporal sequence of compliance specification text, wherein the temporal sequence includes time points and versions of the compliance specification text at the time points;

generating, by the at least one hardware processor and for each time point of the temporal sequence of the compliance specification text, a compliance specification graph by:

generating, for each time point of the temporal sequence of the compliance specification text, nodes that correspond to uniquely identified elements in the compliance specification text; and generating, for each time point of the temporal sequence of the compliance specification text, edges that represent at least one of structural or semantic relations between the nodes;

determining, by the at least one hardware processor and based on an analysis of each of the generated compliance specification graphs, changes in the temporal sequence of the compliance specification text;

modifying, based on the determined changes in the temporal sequence of the compliance specification text, robotic agent instructions associated with a robotic agent; and controlling, by the at least one hardware processor, by the robotic agent, and based on the determined changes in the temporal sequence of the compliance specification text, an operation associated with the robotic agent.

13. The method according to claim 12, wherein for the semantic relations between the nodes, generating, by the at least one hardware processor and for each time point of the temporal sequence of the compliance specification text, the compliance specification graph further comprises:

generating, by the at least one hardware processor and for each time point of the temporal sequence of the compliance specification text, a directed edge from a first node to a second node if there exists an explicit reference for the second node in text of the first node.

14. The method according to claim 12, wherein for the structural relations between the nodes, generating, by the at least one hardware processor and for each time point of the temporal sequence of the compliance specification text, the compliance specification graph further comprises:

connecting, by the at least one hardware processor and for each time point of the temporal sequence of the compliance specification text, sections under a same chapter by neighborhood edges; and connecting, by the at least one hardware processor and for each time point of the temporal sequence of the compliance specification text, section level nodes to chapter level nodes using part-of edges.

15. A non-transitory computer readable medium having stored thereon machine readable instructions, the machine readable instructions, when executed by at least one hardware processor, cause the at least one hardware processor to:

ascertain a temporal sequence of compliance specification text, wherein the temporal sequence includes time points and versions of the compliance specification text at the time points;

generate, for each time point of the temporal sequence of the compliance specification text, a compliance specification graph by:

generating, for each time point of the temporal sequence of the compliance specification text, nodes that correspond to uniquely identified elements in the compliance specification text; and generating, for each time point of the temporal sequence of the compliance specification text, edges that represent at least one of structural or semantic relations between the nodes;

determine, based on an analysis of each of the generated compliance specification graphs, changes in the temporal sequence of the compliance specification text by at least one of determining a structural variation to determine a difference in compliance specification graph structures for the same compliance specification text at two different time points, or determining a semantic variation based on a change to contents of nodes of two of the generated compliance specification graphs; and control, by a robotic agent and based on the determined changes in the temporal sequence of the compliance specification text, an operation associated with the robotic agent.

16. The non-transitory computer readable medium according to claim 15, wherein for determining the structural variation to determine the difference in compliance specification graph structures for the same compliance specification text at two different time points, the machine readable instructions, when executed by the at least one hardware processor, further cause the at least one hardware processor to:

determine node correspondence by identifying a first node from a compliance specification graph at a first time point that includes a same intention as a second node from a compliance specification graph at a second time point that is later than the first time point.

17. The non-transitory computer readable medium according to claim 15, wherein for determining the semantic variation based on the change to contents of nodes of two of the generated compliance specification graphs, the machine readable instructions, when executed by the at least one hardware processor, further cause the at least one hardware processor to:

determine whether details of a node of corresponding nodes of the two of the generated compliance specification graphs have changed so that an object in a domain of influence has an effect that is opposite to previously implied details of the node; and based on a determination that details of the node of the corresponding nodes of the two of the generated compliance specification graphs have changed so that the object in the domain of influence has the effect that is opposite to previously implied details of the node, determine a compliance specification negation with respect to the corresponding nodes of the two of the generated compliance specification graphs.

18. The non-transitory computer readable medium according to claim 15, wherein for the semantic relations between the nodes, the machine readable instructions to generate, for each time point of the temporal sequence of the compliance specification text, the compliance specification graph, when executed by the at least one hardware processor, further cause the at least one hardware processor to:

generate, for each time point of the temporal sequence of the compliance specification text, a directed edge from a first node to a second node if there exists an explicit reference for the second node in text of the first node.

19. The non-transitory computer readable medium according to claim 15, wherein the machine readable instructions to determine, based on the analysis of each of the generated compliance specification graphs, changes in the temporal sequence of the compliance specification text, when executed by the at least one hardware processor, further cause the at least one hardware processor to:

determine a structural variation to determine a difference in compliance specification graph structures for the same compliance specification text at two different time points.

20. The non-transitory computer readable medium according to claim 19, wherein the two different time points include successive time points.

* * * * *